Dec. 12, 1961

H. REINER 3,013,160

TRANSISTOR DOUBLE INTEGRATING CIRCUIT

Filed June 5, 1958

INVENTOR.
H. REINER

BY Robert Harding Jr.

ATTORNEY

United States Patent Office 3,013,160

Patented Dec. 12, 1961

3,013,160
TRANSITOR DOUBLE INTEGRATING CIRCUIT
Hans Reiner, Stuttgart, Germany, assignor to International Standard Electric Corporation, New York, N.Y., a corporation of Delaware
Filed June 5, 1958, Ser. No. 740,084
4 Claims. (Cl. 307—88.5)

Figures 1, 2, 3, 4, 5, 6, 7:
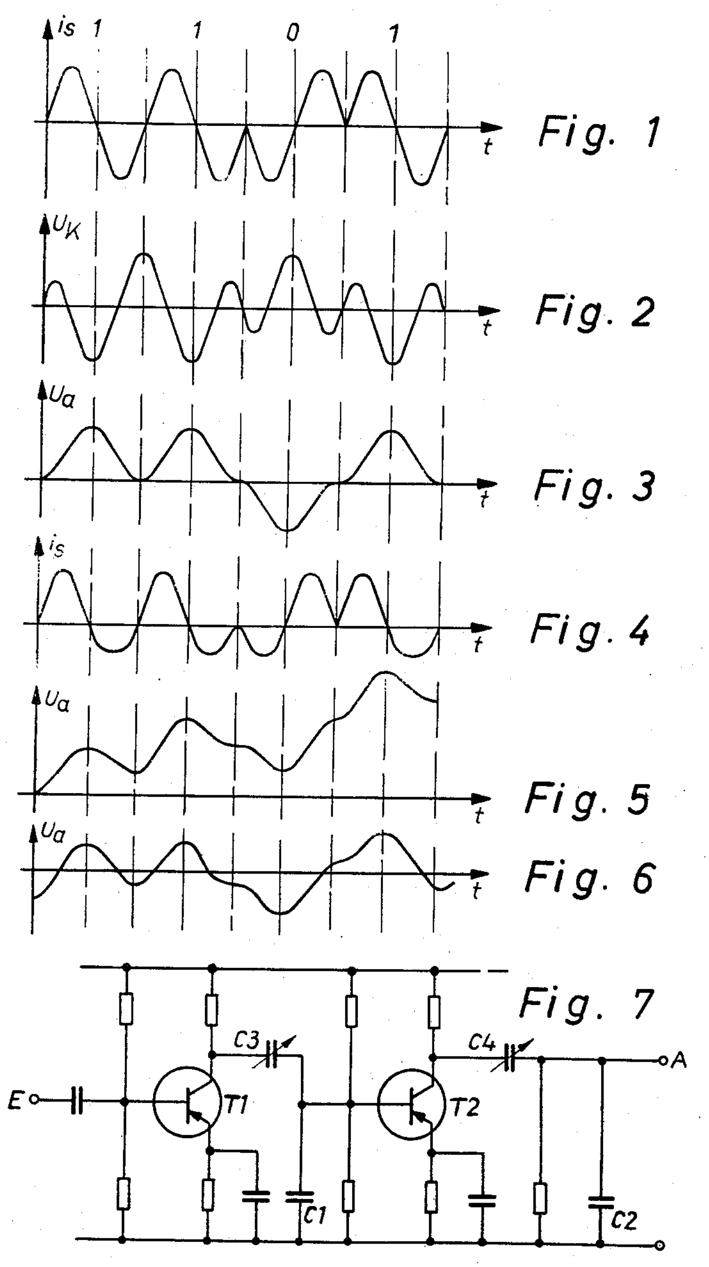

This invention relates to an arrangement for the amplification of reading pulses obtained from binary information storage devices.

For the storing of binary information it is well-known to use magnetizable record means, such as magnetic recording drums, magnetic recording tapes, or the like. For the storing or reading-in of the informations there have already been proposed quite a number of recording methods. One very appropriate and often employed kind of recording is the so-called phase-modulation writing method. In this writing method, according to the phase-modulation system, one complete sine wave is written into each line. In other words each binary element comprises both directions of magnetisation. Whether there is a "0" or a "1" is determined by the polarity of the first half cycle of the sine wave.

At the reading of the stored informations corresponding reading signals will be produced which, as a rule, are directly amplified and in the middle of the line are examined with respect to their sign. The ascertained sign determines whether a "0" or a "1" is concerned. This actually simple method, however, bears two substantial or important disadvantages. First of all, the time during which the reading signal has an unambiguous sign which is dependent upon the read-in information, is small compared with the period of time of one line. Secondly, the bandwidth necessary for the true amplification of the reading signal is high compared with the line frequency. About the tenth harmonic still has to be transmitted.

This last mentioned requirement and the disadvantage which is linked thereto is disturbingly noticed, especially when employing normal junction transistors as amplifying elements. With transistors the highest possible amplification will be obtained when employing an emitter arrangement; but with increasing frequency, i.e. still within range of the voice frequencies, the amplification will start to drop off in proportion with $1/f$.

The object of the present invention is to avoid these disadvantages. The invention in particular relates to an arrangement for the amplification of reading pulses obtained from binary information storage devices, in particular magnetic drum or magnetic tape storage devices, in which the informations are entered according to the so-called phase-modulation writing method. According to the invention the amplification arrangement for the reading signals is made in such a way that a double integration will be effected. By means of this integration, which is effected twice, a signal will be obtained which can be very well evaluated with respect to its sign in the middle of the line, and which has a sign in the middle of the line which is inverted with respect to the reading signal obtained with the aid of the conventional arrangements.

The invention is based on the recognition that the transistor amplifier in a common emitter arrangement in the case of frequencies $f$ greater than 40 kc./s. has a frequency behaviour like an integrating element. By means of the integration of the reading voltage the function of the writing current will again be obtained, because the reading process has a differentiating effect. Of course, slight distortions will appear caused by the gap width of the reading head.

The double integration may be effected e.g. with the aid of two transistor stages in a common emitter arrangement. The amplification achieved is generally sufficient for effecting the subsequent evaluation. The frequency response characteristic which, in the case of transistor amplifiers, drops in proportion with $1/f$, may be stabilized in a simple way by means of additional capacities.

The double integration, however, for obtaining the integration behaviour may also be carried out with the aid of tube amplifiers or similar devices when utilizing the tube and switching capacities of a tube amplifier and of the corresponding devices. Also in this case a stabilisation may be achieved with the aid of additional capacities.

In the course of the writing process, it may now easily happen that, e.g. due to nonlinearities, the integrals extending over the positive and the negative half-wave of the writing current differ from each other. On account of this, it may happen, especially when several signals of the same kind arrive successively, that the zero line is displaced to such an extent that a wrong sign will occur at the reading. This "running away" of the zero line, however, may be avoided by suitably selecting the lower cutoff frequency.

In the case of drum storages, the lower cutoff frequency of the reading signal is determined by the number of rotations of the drum per second. With the conventional arrangements, this number is between 50 and 300 c.p.s. When providing the integrating amplifier with a lower cutoff frequency of 50 c.p.s., the differences between the positive and the negative current potential may be integrated over about 20 milliseconds. However, if the lower cutoff frequency is chosen at 1000 c.p.s., the differences will only integrate over about 1 millisecond. Depending on the asymmetries to be expected, the lower cutoff frequency may be selected to be either higher or lower. Attention should be paid to the fact, however, that the signals themselves will be more deformed, the higher the lower cutoff frequency is selected.

In the following the invention will now be described by way of example with reference to FIGS. 1–7 of the copending drawing:

FIG. 1 shows the writing current and the course of the magnetic flux as a function of time for the binary digits 1101. From this diagram the peculiarity of the phase-modulation writing will be recognized; the "1" starts with the positive half-wave, while the "0" starts with the negative half-wave. Each digit involves one complete wave train.

FIG. 2 shows the reading voltage when reading the informations, as shown in FIG. 1, with the aid of the conventional types of reading devices. The decision as to whether a "1" or a "0" has been read is made by ascertaining the sign in the middle of the line. From FIG. 2 it will be seen that for a "1" the reading signal has a negative sign in the middle of the line.

The curve of the reading voltage, as shown in FIG. 3, is caused by a double integration of the reading signal according to the invention. In this case a well recheckable sign of the signal will be obtained in the middle of the line. In this case a "1" has a positive, and a "0" has a negative sign.

In FIG. 4 the asymmetrical curve of the writing current is shown which may be easily caused by nonlinearities existing in the circuit arrangement. At the integration of this signal, an integral signal will be produced at a normal lower cutoff frequency having the curve corresponding almost to that shown in FIG. 5. In this case, no negative part of the curve will appear at all, so that the decision as to whether it is "1" or "0" is no longer possible. By suitably selecting the lower cutoff frequency, however, the zero line may be displaced in such a way that a curve of the integrated signal will be obtained as is shown in FIG. 6 of the drawings.

For accomplishing the integrating amplification an amplifying arrangement may be used consisting of two transistor stages.

Such an amplifying arrangement comprising two transistors T1 and T2 in a common emitter arrangement is shown in FIG. 7 of the drawings. The reading signals are fed to the input E, and the double integrated signals, as shown in FIG. 3 or FIG. 6, are taken off at the output A. The construction of the amplifying arrangement is well-known and does not need to be described particularly herein.

This integrating amplifier is insensitive to any alterations of the shape of curve of the read signal, as well as to any humming noise. The investment in amplifying elements, and consequently the susceptibility to interference, is substantially lower than with the conventional types of reading amplifiers in which, accordingly, a double integration is not effected. As amplifying elements junction transistors are used with a cutoff frequency in a base arrangement of a few 100 kc./s., whereas this is impossible with the conventional types of reading amplifiers.

For stabilizing the dropping of the frequency response characteristic in proportion with $1/f$ the two capacities C1 and C2 are provided.

By correspondingly reducing the capacities C3 and C4, the lower cutoff frequency of the amplifier arrangement may be increased in such a way that a stabilisation of the position of the zero line will be achieved.

When using coupling transformers instead of the coupling condensers C3 and C4, then, by reducing the main inductances of this transformation, the lower cutoff frequency may be increased.

What is claimed is:

1. A pulse reading amplifier for information storage devices in which information is recorded in binary form in accordance with the phase-modulation writing method comprising means for receiving pulses from a storage device, means for effecting a double integration of pulses received by said receiving means, and means for stabilizing the dropping of the amplification of said amplifier with respect to frequency in accordance with the reciprocal of the frequency.

2. A pulse reading amplifier as defined in claim 1, in which the means for effecting the double integration comprises two transistor stages having common emitter arrangements, and the means for stabilizing the dropping of the amplification comprises a capacitor connected to the output circuit of each transistor.

3. An arrangement, as claimed in claim 1, in which means is provided for adjusting the lower cut-off frequency of the amplifier for stabilizing the position of the zero line.

4. An arrangement, as claimed in claim 3, in which the means for adjusting the lower cut-off frequency of the amplifier comprises means for adjusting the value of the coupling capacitors for amplifier stages.

References Cited in the file of this patent

UNITED STATES PATENTS

| | | |
|---|---|---|
| 2,143,398 | White | Jan. 10, 1939 |
| 2,584,882 | Johnson | Feb. 5, 1952 |
| 2,621,292 | White | Dec. 9, 1952 |
| 2,697,168 | Spaulding | Dec. 14, 1954 |
| 2,889,467 | Endres et al. | June 2, 1959 |

OTHER REFERENCES

Seely Electron Tube Circuits, 2nd edition, received U.S. Patent Office March 31, 1958, published by McGraw-Hill Inc.